United States Patent [19]
Kleinschmidt

[11] Patent Number: 5,490,318
[45] Date of Patent: Feb. 13, 1996

[54] METHOD FOR THE MANUFACTURE OF STATOR-OR-ROTOR-WINDINGS FOR ELECTRICAL MACHINES FROM PARALLEL-WIRES

[75] Inventor: Dieter Kleinschmidt, Karben, Germany

[73] Assignee: Elmotec GmbH, Karben, Germany

[21] Appl. No.: 76,802

[22] Filed: Jun. 14, 1993

[30] Foreign Application Priority Data

Jun. 15, 1992 [DE] Germany ............... 42 19 374.5
Jun. 15, 1992 [DE] Germany ............... 42 19 594.2

[51] Int. Cl.⁶ ............................................... H02K 15/06
[52] U.S. Cl. .................. 29/596; 29/734; 29/736; 140/92.2
[58] Field of Search .................. 29/596, 736, 732, 29/734; 140/92.1, 92.2

[56] References Cited

U.S. PATENT DOCUMENTS 3,346,021 10/1967 Ross.
4,393,904 7/1983 Muskulus .................. 29/736 X
4,489,764 12/1984 Walker ...................... 29/732 X
4,562,642 1/1986 Fichtner ..................... 29/736 X

FOREIGN PATENT DOCUMENTS

0523344A1 1/1993 European Pat. Off..
2071658 9/1971 France.
2808048 8/1979 Germany.
60-152260 8/1985 Japan.

*Primary Examiner*—Carl E. Hall
*Attorney, Agent, or Firm*—Darby & Darby

[57] ABSTRACT

A method for manufacturing of rotor or stator windings for electrical machines comprises the steps of winding a plurality of parallel wires to form at least two groups of coils on a rotating jig. The plurality of parallel wires are fed from a stationary feed device, which is located in a peripheral direction with respect to of the jig. A finished wound group of coils are transferred from the jig to a coil receiver so that at least two groups of coils are transferred consecutively from the jig to the coil receiver so that for each group of coils, the coil receiver is rotated to a different angular position with respect to the jig.

10 Claims, 3 Drawing Sheets

METHOD FOR THE MANUFACTURE OF STATOR-OR-ROTOR-WINDINGS FOR ELECTRICAL MACHINES FROM PARALLEL-WIRES

BACKGROUND OF THE INVENTION

1. Field of the Invention

The present invention relates to a method and device for manufacturing of stator or rotor coils for electrical machines from parallel wires. More specifically, the present invention relates to winding a group of coils on a jig by rotating the jig, and drawing the parallel wires from a stationary feeding device located in a peripheral direction with respect to the jig. When wound, the completed group of coils can be transferred to a coil receiver and a device for the manufacture of stator or rotor windings for electrical machines. The rotating jig is provided with a drive as well as a fixed wire rod guide and a coil receiver in a peripheral direction with respect to the jig.

2. Discussion of the Related Art

The manufacture of windings for electrical machines from parallel wires is relatively difficult because the twisting of the parallel wires should be avoided. The twisting could, for example, alter the desired outside dimensions of the completed groups of coils, thereby not allowing them to fit into the rotor or stator grooves of the electrical machines, or in an earlier stage not allowing them to fit into notches of transfer tools and drawing dies.

For the manufacture of windings from several layers of parallel wires, it is customary to wind the wires on a rotating jig, whereby the parallel wire is delivered by a stationary feeding device which is transportable in a peripheral direction parallel to the jig. The parallel wire could, for example, be unwound from a delivery spool or a delivery drum. While the jig is rotating, the wire is pulled from the feeding device onto the jig. In order to wind a group of coils, the feeding device moves along the axial length of the jig while providing separated compartments for single coils of the group of coils which will be wound successively. After the winding process is finished, the completed group of coils is detached by using a special transfer tool, which is designed for just this purpose and the complete group of coils are transferred to a drawing die and drawn into the stator. As an example, in order to produce a phase at a four pole motor the procedure must be repeated four times. This has the disadvantage that repeated and equally time consuming transfer steps are required for each pole.

Accordingly, it is an object of the invention provide a method and a device for manufacturing the windings of electrical machines to produce coils quickly and reliably.

SUMMARY OF THE INVENTION

The object of the invention is achieved by a method where several groups of coils are transferred successively to the coil receiver, which angular rotary position with respect to the jig varies for each group of coils.

In contrast to conventional methods, the group of coils are not inserted separately in the stator or the rotor of an electrical machine. Instead a completed phase can be prepared on the coil receiver and can then be inserted in the stator or rotor in one step. Aside from the cost benefit relating to the transfer operations, the present invention has the advantage that single groups of coils can be wired before being inserted on the stator or rotor, while on the coil receiver. The coil receiver has, as a general rule, more available space for handling the wiring of the coils. The rotational angular settings can preferably be indexed, but also can be achieved by rotating the coil receiver to predetermined angles.

It is preferred to move the coil receiver during the winding of the group of coils to the coil receiver's proper transfer position to save time in the manufacturing process.

It is also preferred to move the groups of coils to be transferred from the jig to the coil receiver one step at a time. While the coils are in motion, only the sliding friction and not the static friction must be overcome. The one step motion not only saves time, but is also advantageous for the technical control and energy efficiency, because the support of the tension to the jig can be released.

It is also an advantage of the present invention that the coil receiver, after it has received a group of coils, has a rotational speed that is synchronized with the rotating jig, as long as the winding takes place. In this situation, it is no longer necessary to separate the parallel wires of the individual groups of coils. Furthermore, the joint rotation of the coil receiver with the jig assures that the space between two groups of coils, which are switched in series electrically, cannot increase more than the electrical connection between the individual groups of coils allows. The relative coordination of the completely wound groups of coils and the new to be wound or actually wound groups of coils is preserved. Since the connecting of a group of coils can no longer be produced manually, a considerable acceleration of the production speed will be achieved. The parallel wires leading from a group of coils to another group of coils will neither be twisted nor stretched nor torn, which due to the increasing distances between the groups of coils during the winding process can happen and is not tolerable. The completed phase can be inserted in the rotor or stator in one single drawing procedure at which time the connections of the individual groups of coils will have been established. This will reliably avoid errors, which could occur when individual groups of coils are connected manually. These kinds of windings are also more reliable during use, since the connections between the groups of coils do not loosen.

It is advantageous for the arrangements of the coil receiver and the jig to be in a first radial alignment with respect to each other when winding of the groups of coils and when transferring of the groups of coils occur to be in a second radial alignment with respect to each other. In other words, there is a winding position whereby the jig and the coil receiver first assume a radial position with respect to each other, and also a transfer position where the jig and the coil receiver assume a second radial position with respect to each other. Due to both radial positions, imbalances will be reduced. In the transfer position, the jig is located in a relatively off center position with respect to the coil receiver. Should both parts be rotated together there would be a larger imbalance. On the other hand, a transfer of the group of coils in the winding position would be difficult to realize without further measures. Because of the adjustability of the coil receiver and the jig radially this problem is avoided in an elegant yet simple way. In case of a radially immobile jig, the coil receiver can move with respect to the jig, or if the coil receiver is radially immobile and stationary the jig can move in a radial direction. Of course, a combination of movement of both the jig and the coil receiver is possible.

To keep the imbalance as insignificant as possible, a preferred design is provided such that in the first radial alignment position, the central longitudinal axis of the jig and coil carrier are on a common axis of rotation (i.e., they are coaxial). While winding, both the jig as well as the coil carrier rotate around their respective centers. Because of the low relative imbalance, high speeds for winding can be achieved.

A further reduction of the imbalances is achieved in a different, but also preferred embodiment where a first radial alignment of the central longitudinal axis of the jig and the center axis of gravity of the coil receiver with windings wound thereon is achieved. In other words, the axis of the jig and the axis of gravity of the coil receiver with windings are coaxial. In this design the center axis of gravity of the jig are, in any case, located at the central longitudinal axis of the jig. The center of gravity of the wound coil receiver is the result of the combination of the center of gravity of the coil receiver without windings and the center of gravity of the already wound groups of coils on the coil receiver. Since the weight of a group of coils is ordinarily substantially less than the weight of the coil receiver, one can, through a relatively minor displacement in a radial direction of the coil receiver, ensure that the center of gravity of the combined system coil receiver and groups of coils are located on the rotational axis.

In a preferred embodiment, the coil receiver does not rotate during the winding of the first coil but is moved into a second radial alignment position with respect to the jig. When winding the first group of coils there is still no danger of twisting or tearing of the parallel wires, which can be caused by a relative motion between the coil receiver and the jig, which have a connection with a different group of coils to produce a phase. One can take advantage of this situation to relocate the coil receiver to the transfer position. This provides a fairly small, but noticeable time saving, which is useful in the manufacturing process.

It is preferred to have the coil receiver and the jig engage together during a transfer of the group of coils. The jig can also rotate independent from the coil receiver, when winding the coil. Only after the coil is completed, will an engagement between the coil receiver and the jig occur. With such an engagement, the transfer between the jig and the coil receiver is simplified. The group of coils only has to be moved from the jig to the coil receiver. Because the jig and coil receiver are engaged, the gap between these two members is closed, and individual coil windings cannot wind up in a false openings between these two members.

Furthermore, in a preferred embodiment, groups of coils, which are spaced 180 degrees apart on the coil receiver, can be wound directly in succession. This embodiment has the advantage that during winding, groups of coils which cause the coil receiver to become unbalanced occurs only during winding of every second group of coils, because as soon as the individual groups of coils are arranged in pairs on the coil receiver, they will be completely balanced. The balancing of the coil receiver according to the present invention will be relatively simple.

The coil receiver can be moved to a predetermined transfer angle with respect to the jig and provides a reception space for all or at least several groups of coils of a winding or a partial winding.

In every angular setting, the coil receiver can accept all groups of coils belonging to this angular setting. Since sufficient space for all groups of coils of a winding or partial winding (i.e., a pole) is available. The pole or the winding can be completely prefabricated, which will provide a saving of a large number of transfer operations in the machine.

It is preferred to have the coil receiver rotating and have the jig driver synchronized with the coil receiver drive. The jig and the coil receiver should be movable relative to each other at least in one radial direction. This ability to rotate the coil receiver in synchronization with the jig is provided in addition to the indexing (i.e., the timing of the coil receiver relative to the jig). The tinting in various transfer angle positions serves to position the individual groups of coils in proper relation to each other on the coil receiver. The timing also serves to have the rotation of the coil receiver synchronized with the jig, thereby further maintaining the relative position of the last completed group of coils to the actual wound coils, so that there will be no twist or tear between the parallel wires which connect the two groups of coils to each other. The radial direction of the jig and coil receiver are secured through their relative motions to bring the coil receiver to the jig in order to receive the group of coils. The relative radial movement can also be moved in the opposite direction so that a very small imbalance is maintained. The coil receiver drive can be driven by a motor or other drive or directly from the jig. It is also possible to disengage the coil receiver drive if needed.

The jig and the coil receiver preferably have a first radial position relative to each other and have a common rotation axis and have in a second radial position receiver elements of the coil receiver, which can engage with the jig. The first radial position corresponds to a winding position in which the jig and coil receiver can rotate together. The second position corresponds to a transfer position, in which the group of coils can switch from the jig to the coil receiver. When the jig and the coil receiver are not in the transfer position they are not in any common engagement.

The rotating axis runs through the center of gravity axis of the empty coil receiver or with a loaded coil receiver through the resulting center of gravity of the coil receiver and the loaded groups of coils. This placing of the rotating axis will substantially avoid an imbalance during a turning or rotating of the coil receiver, and thus the rotational speed can be substantially increased. Since the coil receiver and the jig must rotate together, the angular velocity can be increased and the time for manufacture of a group of coils is drastically reduced.

The jig and/or the coil receiver are preferably moved axially with respect to each other in the second position, so that the receiver elements of the coil receiver can engage with the jig.

It is also advantageous that the coil receiver and/or the jig each be mounted on a rotating carrier and are radially adjustable with respect to the carder. Because of the ability to rotate the carrier, the ability to rotate the coil receiver and the jig are assured. Due to the radial adjustability of the coil receiver or the jig with respect to their carriers, the resulting centers of gravity are always on the rotational axis.

In a preferred embodiment, the carrier is movable in a perpendicular direction with respect to the rotational axis. Thus, a change from the winding position and the transfer position can be achieved relatively quickly, even when the carrier is movable in a forward and backward direction. The varied winding positions in which the locations of the coils must be arranged can be achieved by the turning of the coil receiver.

It is preferable that the carrier is tied up in at least two positions. These positions are selected so that the coil receiver is in one of the positions with respect to the jig in a winding position, while in the other position it is in the transfer position.

The receiver elements are ductile so that the groups of coils can be fastened to the coil receiver after transfer from the jig to the coil receiver. Because of the tension, the friction between the coil receiver and the groups of coils will be increased. The danger that individual coils of the groups of coils could inadvertently be loosened by the coil receiver and lead to a mixup of the parallel wires is thereby diminished.

Another advantage of the present invention is that the receiver elements are built by using rods, some of which are inclined with respect to their receiver positions. The groups of coils are distributed over a certain length of the rods, thereby insuring tension exists for at least a part of the coils. Additionally, the slope of the rods prevents the individual groups of coils from sliding out of the coil receiver.

The jig is preferably equipped with a pick-off. After the groups of coils are completely wound, the pick-off simplifies and speeds up the changeover of the groups of coils from the jigs to the coil receiver.

Additionally, the jig provides several compartments where each compartment has a retainer finger device coveting the radial circumference of the compartment. The retaining fingers are retractable by a motion of the pick-off device. The retainer finger device can, in the simplest case, be comprised of several retainer fingers and holds the individual coils of a group of coils in their respective compartments. The individual compartments can be adjacent sections of a cylinder with varying diameters. When the pick-off device is activated, it not only exerts an axial force on the individual coils, but also lowers the retainer fingers during the stripping action. Thus, shortly before the stripping, these retainer fingers, which serve to hold the coils in their compartments will be lowered to provide an undisturbed motion of the coils, down from the jig and upwards to the coil receiver.

A preferred embodiment has the retainer finger in a curved track with a guiding device, which has guided projections and can be moved by the pick-off device.

The coil receiver can be designed to act as a transfer tool or as an inserting tool.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EXEMPLARY EMBODIMENTS

Figure 1:
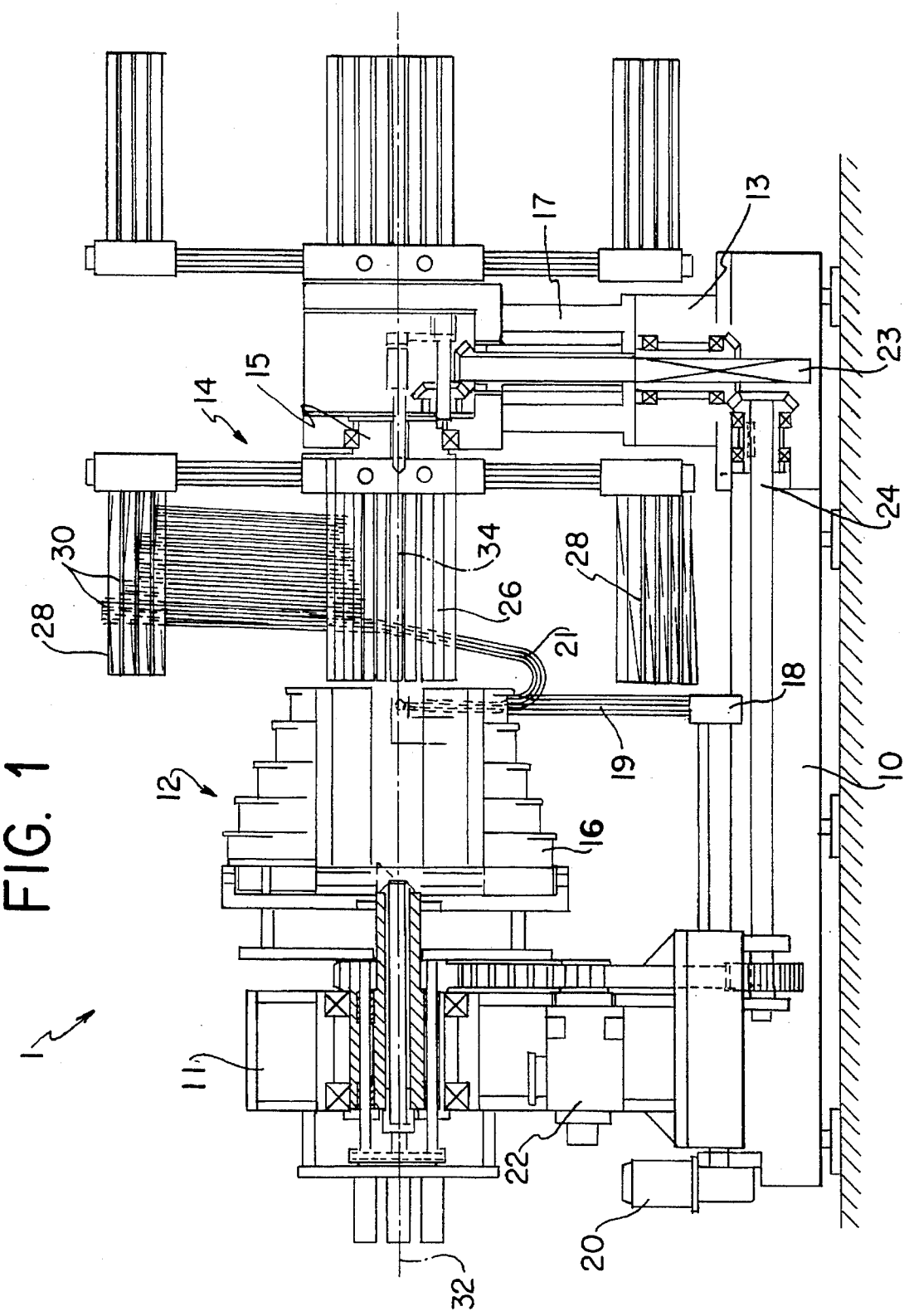
FIG. 1 is a side view of the device for manufacturing windings according to the present invention.

FIG. 1 shows a winding device 1 having a basically U-shaped stand 10. The left leg of stand 10 has a jig 12 attached thereto and the right leg 13 has a coil receiver 14 attached thereto. The jig 12 on the left leg is pivoted and can slide axially. The jig 12 also has a pick-off device 16.

Within the range of the axial length of the jig 12, a shifting unit 18 is provided, which can travel by means of a motor 20 along the jig 12, so that parallel wires 19 can be guided via supply drums or coils (not shown) through the shifting unit 18 to the jig 12, while the jig 12 rotates. The shifting unit 18 is stationary and is disposed in the peripheral direction with respect to the jig 12. Thus, when the jig 12 rotates, the parallel wires 19 will be extracted from the shifting unit 18.

The jig 12 is driven by an additional motor 22, which also drives the coil receiver 14 and is transmitted through a linkage 24 which is guided in a housing 10. The transmission between the motor 22 and the jig 12 or between the motor 22 and the coil receiver 14 is selected in such a way that the coil receiver 14 rotates with the jig 12 with the same rotating speed and the same direction. A clutch device 23 is disposed between the motor 22 and the coil receiver 14, so that, the connection therebetween can be interrupted. The jig 12 can also be driven without the simultaneous rotation of the coil receiver 14.

The coil receiver 14 provides, for the reception of groups of coils, a number of central rods 26, which are arranged in the shape of a round wreath and outer rods 28, which are distributed in single segments in a peripheral direction. The outer rods 28 can be inclined to the outside with the end turning away from the coil receiver 14. This inclination stretches a group of coils on the coil receiver 14 because of the larger distance of the rods 28 from the rods 26 on the outer end, so that the groups of coils cannot slip out of the coil receiver 14.

The coil receiver 14 is mounted on a carrier 15 and can be moved relative to the carrier. The carrier 14 can be moved up or down by a linkage 17 and can be fixed in two positions. The position illustrated in FIG. 1 is the winding position, and the jig 12 and the coil receiver 14 have the same rotational axis (i.e., the central longitudinal axis 32 of the jig 12 aligns with the central longitudinal axis 34 of the coil receiver 14). The jig 12 and the coil receiver 14 can rotate together without tearing or twisting of the wires of the connection 21 between the already completely wound group of coils 30, which have been transferred to the coil receiver 14 and to a new to be wound group of coils on the jig 12 by movement of jig 12. Because the jig 12, as well as the coil receiver 14, are rotating around their central longitudinal axis 32 and 34 there are practically no imbalances; occasionally some imbalances occur, which are easily controllable. Thus, the winding can be achieved with relatively high winding speeds. Should, for example, there be any noticeable influences of the groups of coils on the circular motion of the coil receiver 14 due to the heavy weight of the group of coils, the coil receiver 14 can be moved with respect to the carrier 15 in such a way, that the center of gravity is located on the rotary axis 32 of the jig 12, so that the imbalance will be relatively quickly eliminated. Movement between the coil receiver 14 and the carrier 15 is only then required when a one sided imbalance exists. By a skillful distribution of the individual groups of coils on the coil receiver 14 one can minimize the occurrence of the imbalances. It is, for example, possible to wind groups of coils, which are displaced 180° on the coil receiver 14 immediately in succession. In this case, a larger imbalance can occur only at every second placed group of coils.

The joint ability to turn the jig 12 and coil receiver 14 is, of course, only required when the individual groups of coils are to remain connected to each other. If the connections 21 can be interrupted, the coil receiver 14 can also stand still, while the jig 12 is being turned to wind the groups of coils.

While the jig 12 is being wound with the next group of coils, the coil receiver 14 moves upwards, in order to align the vacant rods 26, 28 with the jig 12. In this position, the jig 12 will move axially to the right. The coil receiver 14 now becomes engaged with the jig 12. The pick-off device 16 is activated and strips the completed wound coils in one draw to the coil receiver 14. It is also possible to move the pick-off device 16 close to the rods 26, 28 of the coil receiver 14, and to return the jig 12 to the left, in order to strip the group of coils. After the group of coils is held to the outside through the inclining of the rods 28, the coil receiver 14 can again move to the winding position as shown in FIG. 1. FIG. 1 shows a group of coils 30 deposited on the coil receiver 14 and the end 21 of the winding fastened on the jig 12. With a renewed start of the jig 12, the coil receiver 14 must also turn, so that the connection at the end 21 is not interrupted.

A rotation of the coil receiver 14 is also not necessary, when no group of coils 30 have been brought to the coil receiver 14 because no connection 21 must be preserved yet.

In the same way, all groups of coils needed for a phase can be transferred to the coil receiver 14. With a four pole machine, for example, four groups of coils per phase, which are each displaced 90° in a peripheral direction, will be deposited in the coil receiver 14. The coil receiver 14 will then be rotated 90° each time with respect to the jig 12 at least after the acceptance of the first three groups of coils. With other numbers of poles the angular steps will change in a corresponding manner. After a complete phase of the coil has been transferred to the coil receiver 14. This coil receiver will swing 180° outside of the jig range. Simultaneously a new coil receiver 14 swings into the jig range. The coil receiver, which swung out will travel to a retracting tool, which is not shown and the coils can be transferred.

Figure 2:
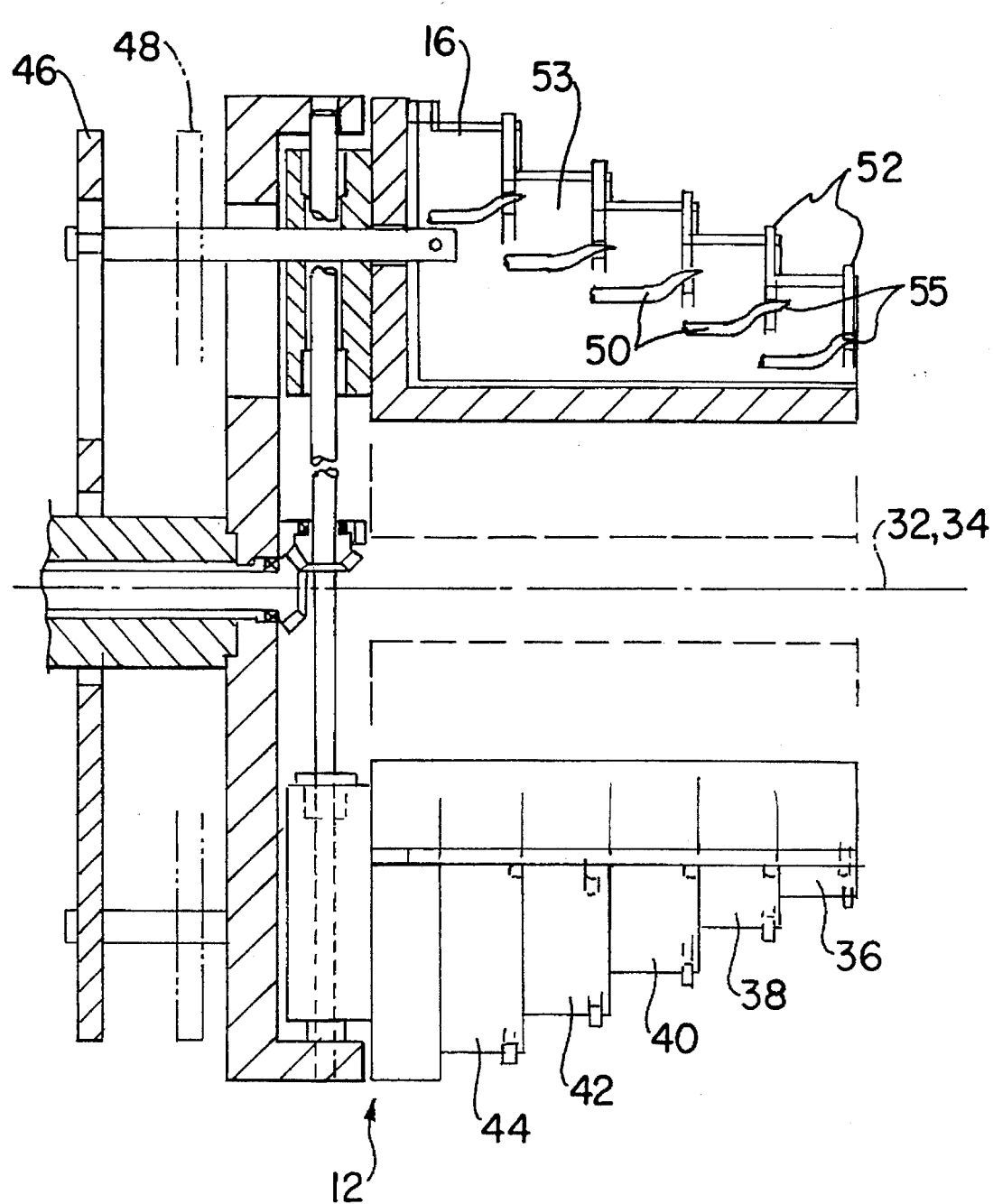
FIG. 2 is a side view of a jig.

Referring to FIG. 2, a jig 12 is shown, in which the stripper 16 is held and guided and has assumed a position in which the jig 12 can be wound. The jig 12 has single compartments 36, 38, 40, 42, 44, whereby each of these compartments is provided for a coil of a group of coils. The individual coils are provided for the varying step widths. When the individual compartments 36 to 44 are wound and when the jig 12 has assumed the transfer position for the coil receiver 14, the stripper 16 can move from a rest position 46 to a stripping position 48. In doing so it releases at first a holding finger 52, which is led over a cam surface 50 by a guiding device 53.

The projections 55 in the cam surface 50 remain in a rest position around the circumference of the individual compartments 36 to 44 and also prevent the sliding down of the coils from the compartments, and eventually strip the entire group of coils 30 in the coil receiver 14. At the return of the pick-off device 16, the retainer fingers 52 are moving again and provide a closure at the time for its winding compartments 36 to 44. This has the advantage that with newer windings, the individual coil windings are better secured in the compartments and consequently more windings can be received. This winding method does not require starting with the smallest compartment 36. It is certainly possible to start with the largest compartment 44 or if it is desired to use only certain compartments or only just one for winding.

Figure 3:
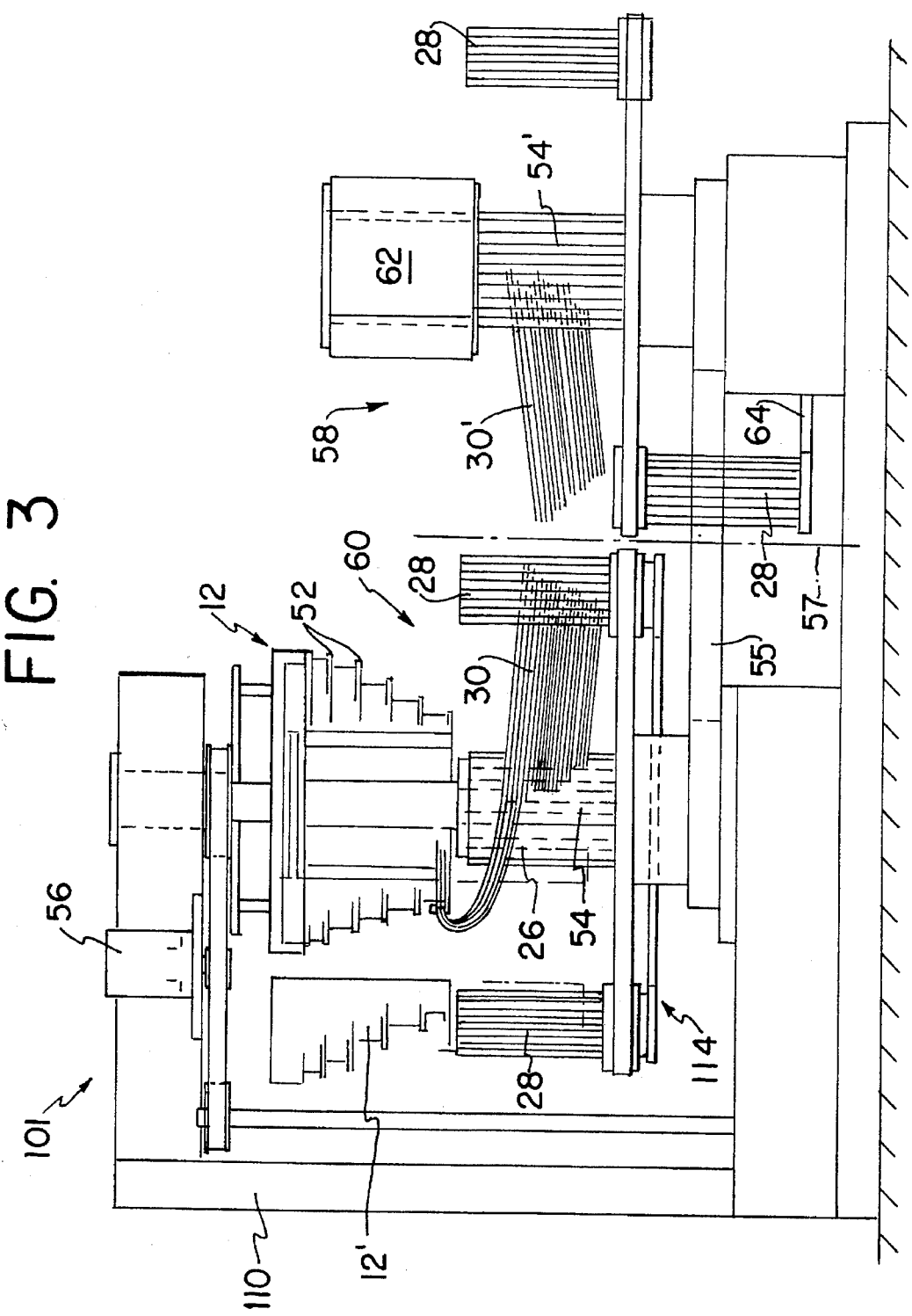
FIG. 3 is a side view of a second embodiment according to the present invention.

FIG. 3 shows an additional embodiment of a winding device 101, where similar parts and other corresponding and equal parts are shown and have the reference numerals designation increased by 100.

In contrast to the design of FIG. 1, the design of FIG. 3 shows the jig 12 and the coil receiver 114 not being adjacent to one another horizontally, but adjacent on top of each other in a vertical direction. In this case the jig 12 is placed above the coil receiver 114. The transfer of the group of coils from the jig 12 to the coil receiver 114 will be supported by gravity after the entrance of the retainer fingers 52.

In the embodiment shown in FIG. 1, the coil receiver 14 was designed as a transfer tool. The coil receiver 114 as shown in FIG. 3 is designed in its form as a drawing die 54. Thus, them are only two more steps necessary to draw in the groups of coils of a phase in the stator of an electric machine. One step is to transfer the groups of coils from the jig 12 to the drawing die 54 and a second step is to transfer the completed partial windings to the electrical machine.

A further change is that the coil receiver 14, no longer moves, but the jig 12 is movable radially opposite its rotation axis, in order to move from a winding position (as shown in FIG. 3 for jig 12) into a transfer position. This is shown as half of a jig 12' and appears to the left of jig 12 in FIG. 3. In this transfer position, jig 12' is located opposite rods 26,28 and can be engaged with them, to make it possible to transfer the group of coils from jig 12 to coil receiver 114 without a problem. Since the coil receiver 114 is also designed as a drawing die 54, the center rods 26 are designed as drawing and cover laminations.

A motor 56 is provided as a rotation driver for jig 12 and coil receiver 114.

FIG. 3 shows two drawing dies 54, 54', which are on a common carrier 55 and can be rotated around the rotation axis 57. While the drawing die 54 is brought to a winding station 60, the other drawing die 54' is brought to a winding station 58. In this location the drawing die lamination 26' will have a stator 62 of an electrical machine put on. Simultaneously a flange 64, which has segments of the outer rods 28 fastened to it, will be dropped lower. In doing so groups of coils 30' will be drawn into the stator 62. During the drawing in of the groups of coils 30' (only one is shown for clarity) another winding or a partial winding can be completed in the winding station 60. After both operations are completed, the carrier 55 will be rotated 180° around axis 57 to facilitate a new winding or partial winding. The drawing in of this partial winding into the stator 62 can be continued without practically any major interruptions.

Having described the presently preferred exemplary embodiment of a new and improved method for manufacturing rotor or stator windings for electrical machines from parallel wires, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What is claimed is:

1. A method for manufacturing of rotor or stator windings for electrical machines comprising the steps of:

winding a plurality of parallel wires to form at least two groups of coils on a rotating jig by rotating the jig and drawing the plurality of parallel wires from a stationary feed device, which is located in a peripheral direction with respect to the jig; and transferring a finished wound groups of coils from the jig to a coil receiver so that at least two groups of coils are transferred consecutively from the jig to the coil receiver and such that for each group of coils, the coil receiver is rotated to a different angular position with respect to the jig.

2. The method according to claim 1, wherein the coil receiver is moved to a predetermined transfer position during the winding step.

3. The method according to claim 1, wherein the transferring of finished groups of coils is accomplished one group at a time from the jig to the coil receiver.

4. The method according to claim 1, wherein a rotation of the coil receiver is synchronized with the rotation of the jig, at least after the coil receiver receives a group of coils while the winding step takes place.

5. The method according to claim 1, wherein the coil receiver and the jig are brought to a first radial alignment with respect to each other during the winding step and into a second radial alignment with respect to each other during the transferring step.

6. The method according to claim 5, wherein a central longitudinal axis of the jig and a central longitudinal axis of the coil receiver are located coaxial in the first radial alignment position.

7. The method according to claim 5, wherein in the first radial alignment position, a central longitudinal axis of the jig and a center axis of gravity of the coil receiver, having wound coils thereon, are substantially coaxial.

8. The method according to claim 5, wherein the coil receiver during the winding step of the first coil only, does not rotate, and is in the second radial alignment position.

9. The method according to claim 1, wherein the coil-receiver and the jig are engaged with each other during the transferring step.

10. The method according to claim 1, wherein the groups of coils, which are located on the coil receiver, are disposed 180° apart from each other and are wound in consecutive order.

* * * * *